United States Patent
Choi et al.

(10) Patent No.: US 11,760,647 B2
(45) Date of Patent: Sep. 19, 2023

(54) AEROGEL PRECURSOR AND AEROGEL PRODUCED USING SAME

(71) Applicant: LG CHEM, LTD., Seoul (KR)

(72) Inventors: Hee Jung Choi, Daejeon (KR); Se Hyun Kwon, Daejeon (KR); Yeong Rae Chang, Daejeon (KR); Seok Hoon Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 733 days.

(21) Appl. No.: 16/767,303

(22) PCT Filed: Dec. 7, 2018

(86) PCT No.: PCT/KR2018/015571
§ 371 (c)(1),
(2) Date: May 27, 2020

(87) PCT Pub. No.: WO2019/112393
PCT Pub. Date: Jun. 13, 2019

(65) Prior Publication Data
US 2020/0407231 A1   Dec. 31, 2020

(30) Foreign Application Priority Data
Dec. 8, 2017 (KR) .......... 10-2017-0167918

(51) Int. Cl.
| | | |
|---|---|---|
| *B01J 13/00* | (2006.01) | |
| *C01B 33/158* | (2006.01) | |
| *C01B 33/159* | (2006.01) | |
| *C08G 77/46* | (2006.01) | |
| *C08K 5/5455* | (2006.01) | |

(52) U.S. Cl.
CPC ....... *C01B 33/1585* (2013.01); *B01J 13/0091* (2013.01); *C01B 33/159* (2013.01); *C08G 77/46* (2013.01); *C08K 5/5455* (2013.01); *C01P 2006/90* (2013.01)

(58) Field of Classification Search
CPC ........ C08G 65/22; C07F 7/025; C07F 7/1804; C01B 33/1585; B01J 13/0091
See application file for complete search history.

(56) References Cited

U.S. PATENT DOCUMENTS

| | | |
|---|---|---|
| 2005/0192366 A1 | 9/2005 | Ou et al. |
| 2005/0192367 A1* | 9/2005 | Ou ............... C01B 33/1585 521/64 |
| 2010/0155644 A1 | 6/2010 | Ou et al. |
| 2013/0309453 A1 | 11/2013 | Biver et al. |
| 2015/0114907 A1 | 4/2015 | Gong et al. |
| 2018/0162737 A1 | 6/2018 | Choi et al. |
| 2018/0179073 A1 | 6/2018 | Oh et al. |

FOREIGN PATENT DOCUMENTS

| | | |
|---|---|---|
| CN | 101014535 | 8/2007 |
| CN | 101072727 | 11/2007 |
| CN | 103951966 | 7/2014 |
| CN | 107406327 | 11/2017 |
| EP | 0775669 A2 | 5/1997 |
| JP | 2007-524739 | 8/2007 |
| KR | 10-20070022003 | 2/2007 |
| KR | 10-20070022004 | 2/2007 |
| KR | 10-20120070948 | 7/2012 |
| KR | 10-20140010939 | 1/2014 |
| KR | 10-20160122634 | 10/2016 |
| KR | 10-20170107739 | 9/2017 |
| WO | 2005098553 | 10/2005 |

OTHER PUBLICATIONS

Fischer (Macromol. Symp. 2008, 285, 134-143).*
Fischer et al., "Monitoring of the Sol-Gel Synthesis of Organic-inorganic Hybrids by FTIR Transmission, FTIR/ATR, NIR and Raman Spectroscopy," Macromol. Symp. 265:134-143 (2008).
Li et al., "Coordination assembly and characterization of europium(III) complexes covalently bonded to SBA-15 directly functionalized by modified polymer," RSC Advances 3:14057-14065 (2013).
Qiao, X. and Yan, B., "Molecular construction and photophysics of luminescent covalently bonded hybrids by grafting the lanthanide ions into the silicon-oxygen networks and carbon chains," Journal of Photochemistry and Photobiology A: Chemistry 199:188-196 (2008).
Ma et al., "Preparation and characterization of inorganic-organic hybrid proton exchange membranes based on phosphorylated PVA and PEG-grafted silica particles," J. Sol-Gel Sci. Technol. 48:267-271 (2008).
Radi et al., "Effect of dangling chains on the structure and physical properties of a tightly crosslinked poly(ethylene glycol) Network," Soft Matter 9: 3262-3271 (2013).
Siegmann et al., "Coatings and Aerogels Based on Sol-Gel Processes," Chimia 62(10): 815-819 (2008).
Kim et al., "Ambient drying silica aerogel coatings modified with polyethylene glycol," Journal of Ceramic Processing Research 18(1): 55-58 (2017).
Li et al., "'Seeded' growth of silica aerogel by tetraethoxysilane and trimethylchlorosilane co-precursor method," Journal of Non-Crystalline Solids 362: 216-221 (2013).

* cited by examiner

*Primary Examiner* — Kuo Liang Peng
(74) *Attorney, Agent, or Firm* — Bryan Cave Leighton Paisner LLP

(57) ABSTRACT

Provided is a hydrophobic silica aerogel precursor, and a hydrophobic silica aerogel produced using the same. In the methods, a linear silane crosslinking agent containing a PEG-derived unit is introduced when preparing a hydrophobic aerogel precursor, resulting in the production of a hydrophobic silica aerogel having improved high-temperature thermal stability and improved physical properties.

19 Claims, No Drawings

AEROGEL PRECURSOR AND AEROGEL PRODUCED USING SAME

CROSS-REFERENCE TO RELATED APPLICATIONS

This application is a National Stage Application of International Application No. PCT/KR2018/015571 filed on Dec. 7, 2018, which claims the benefit of Korean Patent Application No. 10-2017-0167918, filed on Dec. 8, 2017, in the Korean Intellectual Property Office, the disclosure of which is incorporated herein in its entirety by reference.

TECHNICAL FIELD

The present invention relates to a hydrophobic aerogel precursor, and aerogel produced using the same.

BACKGROUND

Aerogel is a material having a porous structure in which a $SiO_2$ nano structure is intertwined like a non-woven fabric so that air accounts for 98% of the total volume. The aerogel has a high porosity, pores in the range of 1-50 nm, a high specific surface area, and ultra-insulation and low dielectric properties, and thus is used as an inorganic insulation material. Recently, pre-hydrolyzed TEOS based on tetra ethyl ortho silicate (TEOS) is used as a precursor of aerogel in order to improve the uniform porosity and specific surface area of the aerogel, and pre-hydrolyzed TEOS to which a hydrophobic functional group is introduced is used to produce aerogel having high thermal stability in order to improve the durability of the aerogel as a high temperature insulation material.

In the synthesis of aerogel, TEOS or pre-hydrolyzed TEOS is used as a precursor, and $H_2O$, alcohol, and an acid/base catalyst are used to control the porosity of wet gel. After a surface modification step in which the surface of the wet gel is hydrophobized, aerogel having hydrophobicity is produced through atmospheric pressure drying/supercritical drying. However, a surface modification method in which the surface of wet gel is hydrophobized after the preparation of the wet gel is a 2 phase chemical reaction of liquid/solid, which has a lower reaction efficiency than 1 phase chemical reaction of liquid. Accordingly, when the surface of the wet gel is hydrophobized, a large amount of a hydrophobing agent (surface modifier) is used, so that high temperature durability is deteriorated due to residual hydrophobing agent.

In order to solve the above problem, a method for imparting hydrophobicity to pores by using alkyl alkoxy silane as a co-precursor together with TEOS or pre-hydrolyzed TEOS can be used. However, the method has disadvantages in that gelation control is difficult, pores are uneven, thermal conductivity is increased, and thermal stability is reduced. In order to overcome the above disadvantages, a method for producing aerogel by preparing a hydrophobic aerogel precursor by using a sol-gel forming group having a mono-halide reaction site with a hydrophobic functional group as a monomer in the polymerization of an aerogel precursor can be used. However, there can be a problem in mechanical durability due to defects of hydrophobic pores in the aerogel.

According to the present invention, a pre-hydrolyzed TEOS precursor to which a linear silane crosslinking agent is introduced is prepared, and then aerogel is produced using the same, so that aerogel having high thermal stability and physical stability can be produced.

PRIOR ART DOCUMENT (Patent Document 1) KR 2007-0022003 A (Feb. 23, 2007)

BRIEF DESCRIPTION

Technical Problem

An aspect of the present invention provides a hydrophobic aerogel precursor by introducing a linear silane crosslinking agent comprising a PEG-derived unit in the preparation of an aerogel precursor.

Another aspect of the present invention provides hydrophobic aerogel having improved high temperature thermal stability and improved mechanical physical properties using the hydrophobic aerogel precursor.

Technical Solution

According to an aspect of the present invention, there is provided a method for preparing a hydrophobic aerogel precursor, the method including preparing an alkoxysilane compound or pre-hydrolyzed alkoxysilane compound, and adding a linear silane crosslinking agent to polymerize, the alkoxysilane compound or pre-hydrolyzed alkoxysilane compound wherein the linear silane crosslinking agent comprises a PEG-derived unit.

According to another aspect of the present invention, there is provided a method for preparing a hydrophobic aerogel precursor including an alkoxysilane compound-derived unit and a PEG-derived unit.

According to yet another aspect of the present invention, a hydrophobic aerogel precursor comprising a unit derived from an alkoxy silane compound and a unit derived from PEG is provided According to yet another aspect of the present invention, there are provided hydrophobic silica aerogel using the hydrophobic aerogel precursor and a method for preparing the same.

Advantageous Effects

According to the present invention, a hydrophobic aerogel precursor can be prepared, and using the hydrophobic aerogel precursor, hydrophobic aerogel having uniform pores, improved high temperature thermal stability, and improved mechanical physical properties can be produced.

When the hydrophobic aerogel precursor of the present invention is used, hydrophobic aerogel can be produced without going through a surface modification step during the production of aerogel, so that the cost of purchasing an expensive surface modifier can be saved, and the total process time can be shortened since a surface modification process which takes a long time is not performed.

DETAILED DESCRIPTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

The purpose of the present invention is to produce aerogel having improved high temperature thermal stability and improved mechanical physical properties by introducing a linear silane crosslinking agent including a PEG-derived unit when preparing a hydrophobic aerogel precursor.

Accordingly, the present invention provides a method for preparing a hydrophobic aerogel precursor, the method including preparing an alkoxysilane compound or pre-hydrolyzed alkoxysilane compound, and adding a linear silane crosslinking agent to polymerize the alkoxysilane compound or pre-hydrolyzed alkoxysilane compound, wherein the linear silane crosslinking agent includes a PEG-derived unit.

Hereinafter, the method for preparing a hydrophobic aerogel precursor will be described in detail.

In the method for preparing a hydrophobic aerogel precursor of the present invention, an alkoxysilane compound or an alkoxysilane compound obtained by pre-hydrolyzing the same can be used as an aerogel precursor.

Specifically, the alkoxysilane compound that can be used in the present invention can be one or more selected from the group consisting of tetra methyl ortho silicate (TMOS), tetra ethyl ortho silicate (TEOS), methyl triethyl ortho silicate, dimethyl diethyl ortho silicate, tetra propyl ortho silicate, tetra isopropyl ortho silicate, tetra butyl ortho silicate, tetra secondarybutyl ortho silicate, tetra tertiarybutyl ortho silicate, tetra hexyl ortho silicate, tetra cyclohexyl ortho silicate, and tetra dodecyl ortho silicate, and can be, specifically, tetra ethyl ortho silicate (TEOS).

Meanwhile, the pre-hydrolyzed alkoxysilane compound that can be used in the present invention can have a degree of hydration of 50-80%, more specifically 65-75%. It is preferable to prepare and use an alkoxy disilane-based prepolymer, which is a pre-hydrolyzed alkoxy silane compound, rather than a monomer such as an alkoxysilane compound as an aerogel monomer since gelation reaction time can be easily controlled and storage stability is excellent.

However, when the degree of hydration is less than the above range, a sol gel reaction does not occur smoothly, so that there can be problems in that the molecular weight is decreased and the stability is decreased. When the degree of hydration exceeds the above range, crosslinking density is not controlled, so that there can be problems in that the specific surface area of aerogel is decreased and the pore area is reduced.

Meanwhile, when tetraethoxysilane is used as the alkoxysilane compound, polyethoxydisiloxane (PEDS-$P_x$) can be prepared by hydrolysis and a condensation reaction as shown in Reaction Formula 1 below.

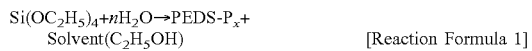
[Reaction Formula 1]

(In Reaction Formula 1 above, n is the number of moles of water used, and n<2.)

When the number of moles of water is 2, that is, n=2, silica particles of $SiO_2$ are generated. When n<2, polyethoxydisiloxane(PEDS-$P_x$) can be prepared as an alkoxy disiloxane-based prepolymer.

Meanwhile, the degree of hydration defines n=2 as the degree of hydration of 100%. For example, n=1 means that the degree of hydration is 50%, and the degree of hydration can be calculated in proportion to the number of moles of water introduced.

A linear silane crosslinking agent including the PEG-derived unit can be prepared by reacting isocyanate silane and polyethylene glycol (n=3 to 24) as shown in Reaction Formula 2 below. In preparing a linear silane crosslinking agent of the present invention, polyethylene glycol (PEG) can be used in various ways depending on the molecular weight.

[Reaction Formula 2]

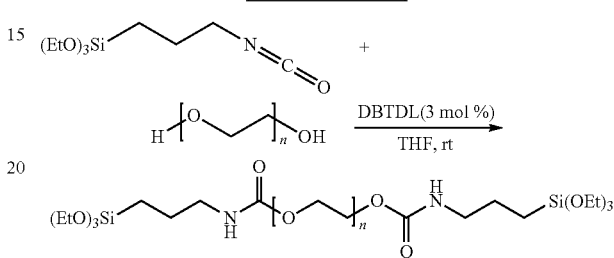

In the present invention, the linear silane crosslinking agent of Formula 1 below and prepared by the reaction above can be used.

Formula 1

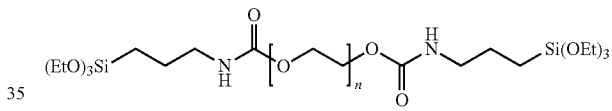

(in Formula 1, n is 3 to 24.)

The linear crosslinking agent includes PEG-derived units. When the linear crosslinking agent is added as a monomer in the production of an aerogel precursor, a hydrophobic functional group is imparted to the aerogel precursor so that it is possible to produced hydrophobized aerogel including hydrophobic pores, and due to a crosslinking reaction between hydrophobized aerogel precursors, it is possible to produced hydrophobized aerogel with improved high temperature thermal stability and mechanical physical properties.

More specifically, the linear silane crosslinking agent of the present invention has a PEG functional group having both hydrophilicity and hydrophobicity in the molecule thereof, thereby having excellent compatibility with sol-gel reactants, and due to the great molecular weight thereof compared to other linear silane compounds, hydrophobic pores are sufficiently generated in the aerogel, so that an aerogel precursor having high porosity and excellent room temperature/high temperature hydrophobicity can be prepared.

Meanwhile, the linear silane crosslinking agent is added in an amount of 0.5-20 mol %, more specifically 1.0-mol % based on the total number of moles of the alkoxysilane compound or the pre-hydrolyzed alkoxysilane compound.

When added less than the above range, the degree of hydrophobicity is not high during the production of silica aerogel, so that the thermal stability and mechanical physical properties of the aerogel can be deteriorated. When added to exceed the above range, the ratio of a silica unit subjected to a gelation reaction is not high during the production of the aerogel, so that the gelation reaction may not be efficiently performed.

The hydrophobic aerogel precursor of the present invention has a weight average molecular weight (MW) of 500-6,500 g/mol, more specifically 1,500-3,500 g/mol. When the weight average molecular weight satisfies the above range, the hydrophobic aerogel precursor can be mass-produced due to the excellent durability thereof, and after the mass production, the hydrophobic aerogel precursor can be stored for a long time to be used for producing aerogel.

Meanwhile, when the weight average molecular weight is less than the above range, the formation time of wet gel can be lengthened and the heat resistance of aerogel can be deteriorated during the production of the aerogel. When the weight average molecular weight exceeds the above range, the durability of an aerogel precursor can be deteriorated.

In addition, the hydrophobic aerogel precursor of the present invention includes 0.2-10 wt % of PEG-derived unit, more specifically 0.5-10 wt %.

When included less than the above range, the degree of hydrophobicity is not high during the production of aerogel, so that the thermal stability and mechanical physical properties of the aerogel can be deteriorated. When included greater than the above range, the ratio of a silica unit subjected to a gelation reaction is not high during the production of silica aerogel, so that the gelation reaction may not be efficiently performed.

In addition, the hydrophobic aerogel precursor of the present invention has a carbon content of 20 wt % or greater, more specifically 30 wt % or greater.

When the carbon content is less than the above range, the hydrophobicity is not high during the production of silica aerogel, so that the thermal stability and mechanical physical properties of the aerogel can be deteriorated. When the carbon content exceeds the above range, the ratio of a silica unit subjected to a gelation reaction is not high during the production of silica aerogel, so that the gelation reaction may not be efficiently performed.

In addition, the present invention provides a hydrophobic aerogel precursor prepared by the method for preparing a hydrophobic aerogel precursor, the hydrophobic aerogel precursor including an alkoxysilane compound-derived unit and a PEG-derived unit.

The specific features of the hydrophobic aerogel precursor is as described in the method for preparing the hydrophobic aerogel precursor.

In addition, the present invention provides a method for producing hydrophobic silica aerogel prepared by using a hydrophobic aerogel precursor.

In the present invention, silica sol is prepared by using the hydrophobic aerogel precursor, and then added with a base/acid catalyst to be subjected to a gelation reaction to prepare silica wet gel. After the silica wet gel goes through an optional aging step, hydrophobic silica aerogel can be produced through atmospheric pressure drying/supercritical drying.

In the method for producing hydrophobic silica aerogel of the present invention, a hydrophobic aerogel precursor is used, so that a surface modification step is not additionally required in the production of silica aerogel.

A surface modifier is expensive and the reaction efficiency thereof is not high. When a large amount of the surface modifier is used, the amount of residual surface modifier is increased, and therefore, a large amount of an expensive solvent is needed to wash the residual surface modifier, and also a long surface modification time is required. Therefore, a typical method for producing hydrophobic silica aerogel through a surface modification step has poor productivity and economical efficiency.

In the present invention, since an aerogel precursor is hydrophobized and used in the production of aerogel, a surface modification step is not additionally required. Therefore, the cost of purchasing an expensive surface modifier can be saved, and the total process time can be shortened since a surface modification process which takes a long time is not performed.

In addition, the present invention provides hydrophobic silica aerogel including a unit derived from a hydrophobic aerogel precursor having a PEG-derived unit. The hydrophobic silica aerogel of the present invention has hydrophobicity well maintained to inner pores thereof, so that the high temperature thermal stability and mechanical physical properties thereof are improved compared to typical hydrophobic silica aerogel.

Specifically, the hydrophobic silica aerogel of the present invention can have a carbon content of 11 wt % or greater, more specifically 12.5 wt % or greater, a specific surface area of 725 m$^2$/g or greater, more specifically 770 m$^2$/g or greater, an average pore diameter of 13.7 nm or greater, a total pore volume of 3.15 cm$^3$/g or greater, more specifically 3.35 cm$^3$/g or greater, a compression strength of 0.025 Mpa or greater, more specifically 0.028 Mpa or greater.

Hereinafter, examples of the present invention will be described in detail so that those skilled in the art can easily carry out the present invention. The present invention can, however, be embodied in many different forms and is not limited to the examples set forth herein.

Preparation Example 1: Preparation of Pre-Hydrolyzed Alkoxysilane Compound (Alkoxy Disiloxane-Based Prepolymer)

150 g of TEOS, 51 g of ethanol, and 0.04 g of 35% HCl aqueous solution were added into a 500 mL reactor, and then stirred while the reaction temperature was raised to 70° C. When the reaction temperature was maintained at 70° C., 19.4 g of acidified distilled water containing 0.02 g of 35% hydrochloric acid aqueous solution was slowly added to the reactor dropwise over 1 hour and then was subjected to an 8-hour reaction.

After the completion of the reaction, the temperature of the reactor was cooled to room temperature. A cooled reactant was filtered under reduced pressure using a filter to remove impurities to prepare 75% hydrolyzed ethoxy disiloxane-based prepolymer (Pre-hydrolyzed TEOS).

Preparation 2: Preparation of Linear Silane Crosslinking Agent Including a Polyethylene Glycol (PEG)-Derived Unit

[Reaction Formula 2]

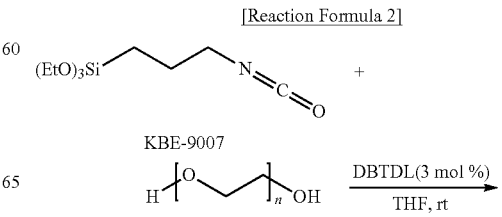

-continued

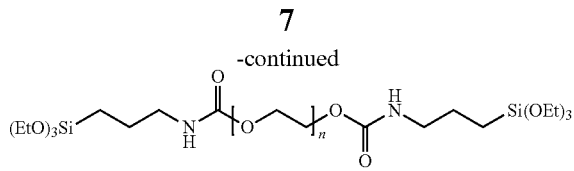

19.79 g of isocyanate silane (KBE-9007, ShinEtsu Co. of Japan), 12.80 g of polyethylene glycol PEG-400 (Korea, Deoksan Pure Chemicals Co., n=8.29.1) were added to a 1000 mL flask, and then added with 0.57 g of dibutyltin dilaurate (DBTDL) such that is added so as to be 3 mol % relative to KBE-9007, and diluted with 300 g of tetrahydrofuran (THF) at room temperature to prepare a linear silane crosslinking agent including a polyethylene glycol(PEG)-derived unit. The mixture was stirred at room temperature until it was confirmed by the Thin Layer Chromatography (TLC) that reactants were all consumed, and then decompressed to remove all the reaction solvent. Thereafter, 28 g of a liquid product having a purity of 95% or greater was obtained in a yield of 91% through column chromatography under a developing solution condition of dichloromethane:methyl alcohol=30:1.

Example 1

The prepolymer solution prepared in Preparation Example 1 was cooled to 0° C. 3.5 g of the linear silane crosslinking agent prepared in Preparation Example 2 (0.5 mol % of the prepolymer prepared in Preparation Example 1) was diluted with 40 g of ethanol and then slowly added dropwise over 4 hours, and the mixture was stirred vigorously for 4 hours to be subjected to a reaction. After the completion of the reaction, the temperature of the reactor was cooled to room temperature to prepare a hydrophobic aerogel precursor.

A mixture of ethanol, distilled water, and ammonia water was slowly added to the hydrophobic aerogel precursor to be subjected to a gelation reaction. At this time, the reaction was performed at room temperature (23±5° C.), and the mixed weight ratio of the hydrophobic aerogel precursor:ethanol:distilled water:ammonia water was 3:8:1:40.1. After stirring for 10 minutes, wet gel was obtained. The obtained wet gel was subjected to supercritical drying under the conditions of 40° C. and 80 atm to prepare hydrophobic aerogel.

Example 2

150 g of TEOS, 51 g of ethanol, 3.5 g of the linear silane crosslinking agent of Preparation Example 2 (0.5 mol % of TEOS), and 0.04 g of 35% HCl aqueous solution were added into a 500 mL reactor, and then stirred while the reaction temperature was raised to 70° C. When the reaction temperature was maintained at 70° C., 19.4 g of acidified distilled water containing 0.02 g of 35% hydrochloric acid aqueous solution was slowly added to the reactor dropwise over 1 hour and then was subjected to an 8-hour reaction. After the completion of the reaction, the temperature of the reactor was cooled to room temperature. A cooled reactant was filtered under reduced pressure using a filter to remove impurities to prepare a hydrophobic aerogel precursor.

A mixture of ethanol, distilled water, and ammonia water was slowly added to the hydrophobic aerogel precursor to be subjected to a reaction. At this time, the reaction was performed at room temperature (23±5° C.), and the mixed weight ratio of the hydrophobic aerogel precursor:ethanol:distilled water:ammonia water was 3:8:1:40.1. After stirring for 10 minutes, wet gel was obtained. The obtained wet gel was subjected to supercritical drying under the conditions of 40° C. and 80 atm to prepare hydrophobic aerogel.

Example 3

A hydrophobic aerogel precursor and hydrophobic aerogel were produced in the same manner as in Example 1, except that 0.35 g of the linear silane crosslinking agent of Preparation Example 2 (0.05 mol % of the prepolymer prepared in Preparation Example 1) was used.

Example 4

A hydrophobic aerogel precursor and hydrophobic aerogel were produced in the same manner as in Example 1, except that 175 g of the linear silane crosslinking agent of Preparation Example 2 (25 mol % of the prepolymer prepared in Preparation Example 1) was used.

Comparative Example 1

The prepolymer solution prepared in Preparation Example 1 was cooled to 0° C. 3.9 g of chlorotrimethylsilane (0.5 mol % of TEOS) was diluted with 40 g of ethanol and then slowly added dropwise over 1 hour, and the mixture was stirred vigorously for 4 hours to be subjected to a reaction. After the completion of the reaction, the temperature of the reactor was cooled to room temperature to prepare a hydrophobic aerogel precursor.

A mixture of ethanol, distilled water, and ammonia water was slowly added to the hydrophobic aerogel precursor to be subjected to a reaction. At this time, the reaction was performed at room temperature (23±5° C.), and the mixed weight ratio of the hydrophobic aerogel precursor:ethanol:distilled water:ammonia water was 3:8:1:40.1. After stirring for 10 minutes, wet gel was obtained. The obtained wet gel was subjected to supercritical drying under the conditions of 40° C. and 80 atm to prepare hydrophobic aerogel.

TABLE 1

| | Aerogel precursor | Crosslinking agent | Amount of linear silane crosslinking agent added* (mol %) |
|---|---|---|---|
| Example 1 | Pre-hydrolyzed TEOS | Linear silane crosslinking agent of Preparation Example 2 | 0.5 |
| Example 2 | TEOS | Linear silane crosslinking agent of Preparation Example 2 | 0.5 |
| Example 3 | Pre-hydrolyzed TEOS | Linear silane crosslinking agent of Preparation Example 2 | 0.05 |
| Example 4 | Pre-hydrolyzed TEOS | Linear silane crosslinking agent of Preparation Example 2 | 25 |
| Comparative Example 1 | Pre-hydrolyzed TEOS | Chlorotrimethylsilane | 5 |

*Amount of linear silane crosslinking agent added (mol %) = [ (Number of moles of linear silane crosslinking agent added)/(Number of moles of alkoxysilane compound or pre-hydrolyzed alkoxysilane compound) ] × 100%)

Experimental Example

The physical properties of each silica aerogel produced in Examples and Comparative Example were measured, and the results are shown in Table 2 below.

1) Tap Density

The TAP density was analyzed using a TAP density measuring device (TAP-2S, Logan Instruments Co.).

2) Specific surface area (BET surface area, $m^2/g$), Average porosity diameter (Dp, nm) and Total pore volume (Vp, $cm^3/g$)

The specific surface area, average pore diameter and pore volume were analyzed by the absorption/desorption amount of nitrogen according to partial pressure (0.11<p/po<1) using ASAP 2010 of Micrometrics Co.

3) Carbon Content (Wt %)

The carbon content was measured using a carbon/sulfur analyzer (CS-800) of Eltra Co.

4) Compression Strength (Mpa)

For cylindrical specimens the surfaces of which were polished to the same height (12 mm) using the UTM (H10K-C, Hounsfield, UK), the degree of deformation by uniaxial pressing was evaluated at a down cross head speed of 5 mm/min.

TABLE 2

| | Tap density (g/ml) | Aerogel Carbon content (wt %) | Specific surface area ($m^2/g$) | Average porosity Diameter (nm) | Total pore volume ($cm^3/g$) | Compression strength (Mpa) |
|---|---|---|---|---|---|---|
| Example 1 | 0.13 | 13.1 | 796 | 14.0 | 3.40 | 0.030 |
| Example 2 | 0.13 | 12.9 | 783 | 13.9 | 3.39 | 0.029 |
| Example 3 | 0.13 | 12.0 | 734 | 13.8 | 3.18 | 0.026 |
| Example 4 | 0.14 | 15.0 | 728 | 14.1 | 3.24 | 0.027 |
| Comparative Example 1 | 0.12 | 10.0 | 724 | 13.6 | 3.13 | 0.024 |

As shown in Table 1 above, the silica aerogel of each of the Examples had excellent specific surface area and a large total pore volume, so that the thermal insulation performance thereof was expected to be excellent and the compression strength thereof was confirmed to be also excellent compared with the silica aerogel of Comparative Example.

The foregoing description of the present invention has been presented for purposes of illustration. It will be understood by those skilled in the art that various changes in form and details can be made therein without departing from the spirit and scope of the invention. It is therefore to be understood that the above-described embodiments are illustrative in all aspects and not restrictive.

The invention claimed is:

1. A method for preparing a hydrophobic aerogel precursor, the method comprising:
preparing an alkoxysilane compound or pre-hydrolyzed alkoxysilane compound; and
adding a linear silane crosslinking agent to polymerize the alkoxysilane compound or pre-hydrolyzed alkoxysilane compound, wherein
the linear silane crosslinking agent comprises a polyethylene glycol (PEG)-derived unit,
wherein a weight average molecular weight (MW) of the hydrophobic aerogel precursor is 500-6,500 g/mol.

2. The method of claim 1, wherein the linear silane crosslinking agent is a compound of Formula 1:

Formula 1

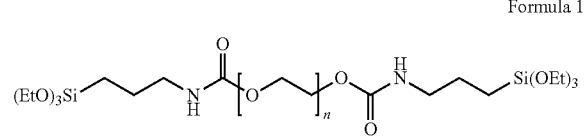

wherein n is 3 to 24.

3. The method of claim 1, wherein the linear silane crosslinking agent is added in an amount of 0.5-20 mol % based on the total number of moles of the alkoxysilane compound or the pre-hydrolyzed alkoxysilane compound.

4. The method of claim 1, wherein the hydrophobic aerogel precursor comprises 0.2-10 wt % of a PEG-derived unit.

5. The method of claim 1, wherein the hydrophobic aerogel precursor has a carbon content of 20 wt % or greater.

6. A method for producing hydrophobic silica aerogel, comprising:
performing a gelation reaction by adding a base and/or an acid catalyst to the hydrophobic aerogel precursor prepared according to the method of claim 1 to yield a silica wet gel; and
drying the silica wet gel to yield a hydrophobic silica aerogel.

7. The method of claim 6, wherein no surface modification is performed.

8. A method for preparing a hydrophobic aerogel precursor, the method comprising:
preparing an alkoxysilane compound or pre-hydrolyzed alkoxysilane compound; and
adding a linear silane crosslinking agent to polymerize the alkoxysilane compound or pre-hydrolyzed alkoxysilane compound,
wherein the linear silane crosslinking agent comprises a polyethylene glycol (PEG)-derived unit, and
wherein a degree of hydration of the pre-hydrolyzed alkoxysilane compound is 50-80%.

9. The method of claim 8, wherein the linear silane crosslinking agent is a compound of Formula 1:

Formula 1

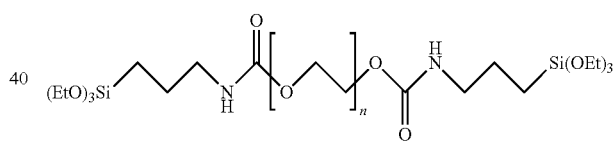

wherein n is 3 to 24.

10. The method of claim 8, wherein the linear silane crosslinking agent is added in an amount of 0.5-20 mol % based on the total number of moles of the alkoxysilane compound or the pre-hydrolyzed alkoxysilane compound.

11. The method of claim 8, wherein a weight average molecular weight (MW) of the hydrophobic aerogel precursor is 500-6,500 g/mol.

12. The method of claim 8, wherein the hydrophobic aerogel precursor comprises 0.2-10 wt % of a PEG-derived unit.

13. The method of claim 8, wherein the hydrophobic aerogel precursor has a carbon content of 20 wt % or greater.

14. A method for producing hydrophobic silica aerogel, comprising:
performing a gelation reaction by adding a base and/or an acid catalyst to the hydrophobic aerogel precursor prepared according to the method of claim 8 to yield a silica wet gel; and
drying the silica wet gel to yield a hydrophobic silica aerogel.

15. Hydrophobic silica aerogel comprising a unit derived from the hydrophobic aerogel precursor of claim 14.

16. A hydrophobic aerogel precursor, comprising:
an alkoxysilane compound-derived unit; and
a PEG-derived unit,
wherein a weight average molecular weight (MW) of the hydrophobic aerogel precursor is 500-6,500 g/mol.

17. The hydrophobic aerogel precursor of claim 16, wherein the PEG-derived unit is present in an amount of 0.2-10 wt %.

18. The hydrophobic aerogel precursor of claim 16, wherein the hydrophobic aerogel precursor has a carbon content of 20 wt % or greater.

19. Hydrophobic silica aerogel comprising a unit derived from the hydrophobic aerogel precursor of claim 16.

* * * * *